(12) United States Patent
Reineck

(10) Patent No.: US 6,886,840 B2
(45) Date of Patent: May 3, 2005

(54) HEAVY DUTY TRAILING ARM SUSPENSION SYSTEM

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 107 days.

(21) Appl. No.: 10/194,817

(22) Filed: Jul. 12, 2002

(65) Prior Publication Data

US 2004/0007845 A1 Jan. 15, 2004

(51) Int. Cl.⁷ .............................................. B06G 21/055
(52) U.S. Cl. ......................... 280/124.107; 280/124.106
(58) Field of Search .................. 280/124.107, 124.106, 280/124.149, 124.152, 124.13

(56) References Cited

U.S. PATENT DOCUMENTS

| | | | | |
|---|---|---|---|---|
| 4,415,179 A | * | 11/1983 | Marinelli | 280/124.116 |
| 5,524,921 A | * | 6/1996 | Ellingsen | 280/124.116 |
| 5,711,544 A | * | 1/1998 | Buhl | 280/124.116 |
| 6,089,583 A | * | 7/2000 | Taipale | 280/124.13 |
| 6,267,526 B1 | * | 7/2001 | McLaughlin | 403/150 |
| 6,375,203 B1 | * | 4/2002 | Warinner et al. | 280/81.6 |
| 6,508,482 B1 | * | 1/2003 | Pierce et al. | 280/124.116 |
| 6,511,084 B1 | * | 1/2003 | Buhl et al. | 280/124.107 |
| 6,533,299 B1 | * | 3/2003 | Platner | 280/124.1 |
| 6,557,875 B1 | * | 5/2003 | Schlosser et al. | 280/124.153 |

FOREIGN PATENT DOCUMENTS

WO      WO 01/38113      5/2001

OTHER PUBLICATIONS

"ADL Series Drive Axle Air–Ride Suspension", Freightliner, Nov. 2001, pp. 1–2, Muskegon Michigan.
U.S. patent application: "Suspension Trailing Arm", filed on Jul. 12, 2002. Inventor Benjamin R. Reineck.
U.S. patent application: "Trailing Arm Suspension Anti–Roll Bar", filed Jul. 12, 2002. Inventor Benjamin R. Reineck.

* cited by examiner

Primary Examiner—Charles T. Jordan
Assistant Examiner—Bret Hayes
(74) Attorney, Agent, or Firm—Carlson, Caskey & Olds, P.C.

(57) ABSTRACT

The present invention provides a heavy duty suspension system including a frame and a pair of spaced apart trailing arms. The trailing arms each include a forward portion pivotally supported by the frame and extending longitudinally to a rearward portion. An axle has opposing end portions pivotally supported respectively on the trailing arms. A V-rod includes first and second spaced apart ends extending to a common third end with the first and second ends preferably pivotally attached to the frame. The third end is preferably pivotally attached to the axle. The V-rod provides lateral stability and defines a pinion angle with the trailing arms. Preferably, the longitudinal length of the V-rod and the length of the trailing arm from the pivotal attachment on the frame to the pivotal attachment on the axle are of equal length to provide a constant pinion angle during movement of the suspension system.

17 Claims, 2 Drawing Sheets

HEAVY DUTY TRAILING ARM SUSPENSION SYSTEM

BACKGROUND OF THE INVENTION

This invention relates to a heavy duty suspension system such as for a motorhome, and more particularly, the invention relates to a trailing arm suspension system.

Various types of suspension configurations have been used for heavy duty applications. For drive axles, the suspension geometry affects the pinion angle. Pinion angle is the angle between the axle input shaft axis and the drive shaft axis. It is desirable to have as little pinion angle as possible to reduce wear. Additionally, it is desirable to have equal angles between the driveshaft axis and the axle input shaft axis and the transmission output shaft axis to balance the forces on the yokes.

Trailing arm suspensions have been employed for heavy duty applications such as for motorhomes. An axle may be rigidly or pivotally secured to the trailing arm. For drive axle trailing arm suspensions, such as for motorhome applications, the pinion angle of the axle is frequently defined by an upper attachment member. The upper attachment member and trailing arm defines the pinion angle during the operation of the suspension. One suspension configuration has employed a rod arranged longitudinally between the frame and the axle to define the pinion angle. This configuration additionally employs a lateral rod connected between the axle and the frame. Such a configuration of rods has the undesirable effect of moving the axle input shaft along an arcuate path in a vertical lateral plane during suspension operation. Instead of the rods, the upper attachment member may be defined by a triangular plate. The apex of the plate is pivotally attached to the axle and the side opposing the apex is attached between opposing frame rails. However, the plate lacks sufficient structural integrity as an upper attachment member and is difficult to install and service. Therefore, what is needed is an improved heavy duty trailing arm suspension system.

SUMMARY OF THE INVENTION AND ADVANTAGES

The present invention provides a heavy duty suspension system including a frame and a pair of spaced apart trailing arms. The trailing arms each include a forward portion pivotally supported by the frame and extending longitudinally to a rearward portion. An axle has opposing end portions pivotally supported respectively on the trailing arms. A V-rod includes first and second spaced apart ends extending to a common third end with the first and second ends preferably pivotally attached to the frame. The third end is preferably pivotally attached to the axle. The V-rod provides lateral stability and defines a pinion angle with the trailing arms. Preferably, the longitudinal length of the V-rod and the length of the trailing arm from the pivotal attachment on the frame to the pivotal attachment on the axle are of equal length to provide a constant pinion angle during movement of the suspension system.

Accordingly, the above invention provides an improved heavy duty trailing arm suspension system.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
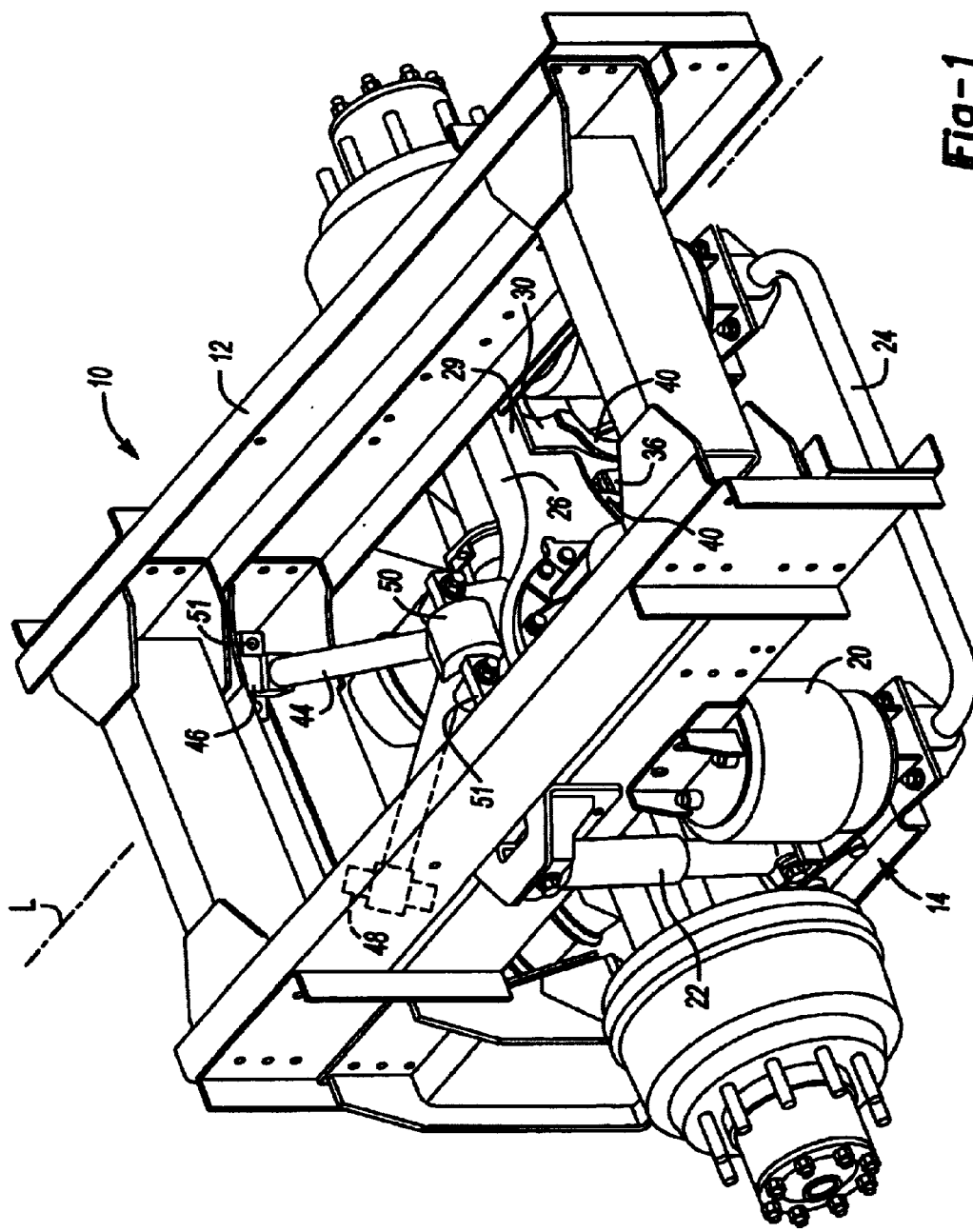
FIG. 1 is a top rearward perspective view of the present invention suspension system.
Figure 2:
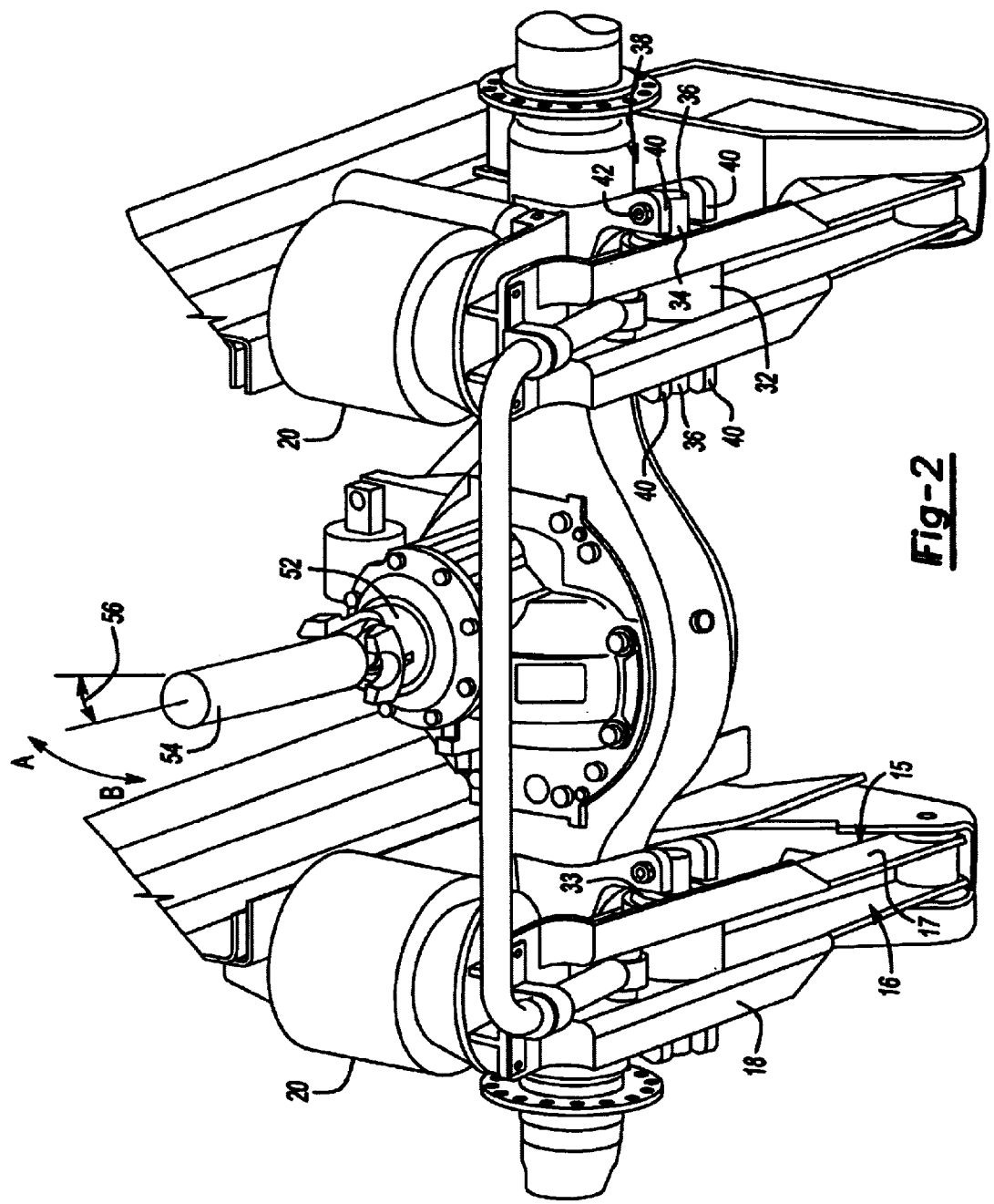
FIG. 2 is a bottom rearward perspective view of the suspension system shown in FIG. 1.

A suspension system 10 is shown in FIGS. 1 and 2. The system 10 includes a frame that may include longitudinal rails, brackets, and other structural members secured by welds, fasteners or other attachment means. The suspension system 10 includes a pair of spaced apart trailing arms 14. The trailing arms 14 are preferably formed of a rather thick metal forming having opposing sides and an upper side 15 adjoining the opposing sides to form an inverted U-shape. The lower side 16 is open forming a channel, as best shown in FIG. 2. The trailing arms 14 include a forward portion 17 pivotally attached to the frame and extending longitudinally rearward to a rearward portion 18. Air springs 20 and shock absorbers 22 may be arranged between the trailing arms 14 and the frame 12. An anti-roll bar 24 may be removably secured between the trailing arms 14 to provide stability to the vehicle during turning maneuvers.

The suspension system 10 extends along a longitudinal axis L. An axle 26 includes opposing end portions 29 that are pivotally secured to the trailing arms 14 via brackets 30. The trailing arms 14 may include a sleeve 32 welded between the opposing sides of the trailing arm 14. A pin 34 may be disposed within the sleeve 32 and laterally located using a flexible material 33 which provides some compliance during movement of the suspension. The pins 34 include opposing ends 36 with apertures (not shown). A conventional bushing arrangement may be used such as the one depicted on the forward portion 17. The brackets 30 include an upper end attached to the end portions 29 of the axle 26 by welding or other attaching means. The brackets 30 includes lower ends 38 having spaced apart legs 14. Each of the legs 40 are secured to the opposing ends 36 by fastening members 42. The bracket 30 straddles the trailing arm 40 such that the legs 40 are on either side of the trailing arm 14.

A V-rod 44 is attached between the frame 12 and the axle 26 to provide stability to the axle 26 during movement of the suspension. The V-rod 44 includes first 46 and second 48 ends extending to a common third end 50. The first 46 and second 48 ends are pivotally secured to the frame by a pin 51 rotatably received in the ends and secured to the frame 12 by fastening members. Similarly, the third end 50 is secured to the axle 26 by pin 51 rotatably received in the end and secured to the axle 26 by fastening elements.

The axle includes an input shaft 52 receiving rotational drive from a driveshaft 54 from an engine, typically located rearward of the suspension system 10 for motor home applications. Pinion angle is defined by the configuration of the trailing arms 14 and the V-rod 44. The present invention suspension system configuration is that of a parallelogram, preferably so that the pinion angle 56 remains constant as the suspension system moves between first A and second B positions. Said another way, the pivotal attachment from the trailing arm 14 to the frame 12 to the pivotal attachment of the trailing arm 14 to the axle 26 defines a first length. The longitudinal distance from the first and second ends 46 and 48 to the third end 50 defines a second length. The first and second lengths are equal. The vertical distance from the first and second ends 46 and 48 and the pivotal connection from the trailing arm 14 to the frame 12 defines a third length. The vertical distance from the third end 50 and the pivotal connection between the axle 26 and the trailing arm 14 defines a fourth length. The third and fourth lengths are equal. In this manner, a parallelogram suspension configuration is provided in which the pinion angle 56 is maintained during movement of the suspension between first A and second B positions.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A heavy duty suspension system comprising:
   a frame;
   a pair of spaced apart trailing arms each including a forward portion pivotally supported by said frame and extending longitudinally to a rearward portion;
   an axle having opposing end portions pivotally supported respectively on said trailing arms, wherein said axle includes brackets attached to each of said end portions with a lower end of said brackets pivotally secured to each of said trailing arms at a lateral axis parallel to an axis of said axle permitting articulation of said axle relative to said trailing arms about said lateral axis;
   a V-rod having first and second spaced apart ends extending to a common third end with said first and second ends attached to one of said frame and said axle and said third end attached to the other of said frame and said axle, said V-rod providing lateral stability and defining a pinion angle with said trailing arms.

2. The suspension system according to claim 1, wherein an air spring and a shock absorber extend between each of said trailing arms and said frame.

3. The suspension system according to claim 1, wherein said first and second ends are pivotally secured to said frame and said third end is pivotally secured to said axle.

4. The suspension system according to claim 1, wherein said lower ends include spaced apart legs arranged on opposing sides of each of said of trailing arms.

5. The suspension system according to claim 4, wherein a pin is laterally located in each of said trailing arms with opposing ends of said pins including apertures arranged generally longitudinally and receiving fastening members securing said legs to said opposing ends.

6. The suspension system according to claim 1, wherein an anti-roll bar is removably secured between said trailing arms.

7. A heavy duty suspension system comprising:
   a frame;
   a pair of spaced apart trailing arms each including a forward portion pivotally supported by said frame and extending longitudinally to a rearward portion;
   an axle having opposing end portions pivotally supported respectively on said trailing arms;
   a V-rod having first and second spaced apart ends extending to a common third end with said first and second ends attached to one of said frame and said axle and said third end attached to the other of said frame and said axle, said V-rod providing lateral stability and defining a pinion angle with said trailing arms, wherein said axle is movable between first and second positions with said pinion angle constant between said first and second positions.

8. The suspension system according to claim 1, wherein said trailing arms include upper and lower sides with said upper side closed and defined by an upper wall and said lower side open defining an inverted U-shaped channel.

9. A heavy duty suspension system comprising:
   a frame;
   a pair of spaced apart trailing arms each including a forward portion pivotally supported by said frame and extending longitudinally to a rearward portion;
   an axle having opposing end portions pivotally supported respectively on said trailing arms, wherein said axle includes brackets attached to each of said end portions with a lower end of said brackets pivotally secured to each of said trailing arms permitting fore and aft movement of said axle relative to said trailing arms;
   a V-rod having first an second spaced apart ends extending to a common third end with said first and second ends attached to one of said frame and said axle and said third end attached to the other of said frame and said axle, said V-rod providing lateral stability and defining a pinion angle with said trailing arms.

10. The suspension system according to claim 9, wherein an air spring and a shock absorber extend between each of said trailing arms and said frame.

11. The suspension system according to claim 9, wherein said first and second ends are pivotally secured to said frame and said third end is pivotally secured to said axle.

12. The suspension system according to claim 9, wherein said lower ends include spaced apart legs arranged on opposing sides of each of said trailing arms.

13. The suspension system according to claim 12, wherein a pin is laterally located in each of said trailing arms with opposing ends of said pins including apertures arranged generally longitudinally, receiving fastening members securing said legs to said opposing ends.

14. The suspension system according to claim 9, wherein an anti-roll bar is removably secured between said trailing arms.

15. The suspension system according to claim 9, wherein said axle is movable between first and second positions with said pinion angle constant between said first and second positions.

16. The suspension system according to claim 9, wherein said trailing arms include upper and lower sides with said upper side closed and defined by an upper wall and said lower side open defining an inverted U-shaped channel.

17. The suspension system according to claim 6, wherein said anti-roll bar is secured to said rearward portions of trailing arms.

* * * * *